US005426943A

United States Patent [19]

Althaus et al.

[11] Patent Number: 5,426,943

[45] Date of Patent: Jun. 27, 1995

[54] GAS TURBINE COMBUSTION CHAMBER

[75] Inventors: Rolf Althaus, Flawil; Burkhard Schulte-Werning, Basel, both of Switzerland

[73] Assignee: Asea Brown Boveri AG, Baden, Switzerland

[21] Appl. No.: 340,454

[22] Filed: Nov. 14, 1994

Related U.S. Application Data

[63] Continuation of Ser. No. 159,556, Dec. 1, 1993, abandoned.

[30] Foreign Application Priority Data

Dec. 17, 1992 [DE] Germany ........................ 42 42 721.5

[51] Int. Cl.[6] ................................................ F02C 3/14

[52] U.S. Cl. .......................................... 60/722; 60/760

[58] Field of Search ..................... 60/39.36, 39.37, 722, 60/752, 760, 748

[56] References Cited

U.S. PATENT DOCUMENTS

| | | | |
|---|---|---|---|
| 872,806 | 12/1907 | Ferranti | 60/760 |
| 3,169,369 | 2/1965 | Holl | 60/760 |
| 3,589,128 | 6/1971 | Sweet . | |
| 4,361,010 | 11/1982 | Tanrikut . | |
| 4,362,500 | 12/1982 | Eriksson et al. | 60/760 |
| 4,504,213 | 3/1985 | Markus | 60/760 |
| 5,081,844 | 1/1992 | Keller et al. | 60/737 |
| 5,169,302 | 12/1992 | Keller | 431/173 |

FOREIGN PATENT DOCUMENTS

| | | |
|---|---|---|
| 2355547 | 5/1974 | Germany . |
| 2408542 | 1/1975 | Germany . |
| 2836539C2 | 5/1990 | Germany . |

OTHER PUBLICATIONS

"Combustor Cooling—Old Problems and New Approaches", Nealy, *Liner Cooling*, pp. 151–185.

"Gas Turbine Combustion Unit", Patent Abstracts of Japan, M–632, Oct. 16, 1987, vol. 11, No. 318 (Appl. No. 60–243618).

*Primary Examiner*—Louis J. Casaregola

*Attorney, Agent, or Firm*—Burns, Doane, Swecker & Mathis

[57] ABSTRACT

In a gas turbine combustion chamber (1)—having environment-friendly burners (5) which consist of at least two hollow partial conical bodies which are positioned one upon the other in the flow direction and whose longitudinal axes of symmetry extend radially offset relative to one another, by which means tangential opposed-flow air inlet slots are produced for a combustion air flow, at least one nozzle for spraying in the fuel being placed in the hollow conical space formed by the cone-shaped partial conical bodies, and having a cooling duct (4), which is bounded by the combustion chamber inner wall (2) and the combustion chamber outer wall (3), along which the cooling air flows and in which longitudinal and transverse ribs (8) can be arranged—the cooling duct (4) has a continuously decreasing height and/or increasing surface roughness in the flow direction of the cooling air. The total mass flow coming from the compressor (7) is used for pure convective cooling of the combustion chamber inner wall (2) and takes part in the combustion.

5 Claims, 3 Drawing Sheets

GAS TURBINE COMBUSTION CHAMBER

This application is a continuation of application Ser. No. 08/159,556, filed Dec. 1, 1993, (abandoned).

BACKGROUND OF THE INVENTION

1. Field of the Invention

The invention relates to a gas turbine combustion chamber with environment-friendly burners which consist of at least two hollow partial conical bodies which are positioned one upon the other in the flow direction and whose longitudinal axes of symmetry extend radially offset relative to one another, the walls of the combustion chamber being protected by cooling from excessive material temperatures, and a method of operating the combustion chamber.

2. Discussion of Background

Such gas turbine combustion chambers are known. Thus, for example, annular combustion chamber walls of gas turbines—are equipped with environment-friendly burners, which consist of at least two hollow partial conical bodies which are positioned one upon the other in the flow direction and whose longitudinal axes of symmetry extend radially offset relative to one another, by which means tangential opposed-flow air inlet slots are produced for a combustion air flow, at least one nozzle for spraying in the fuel being placed in the hollow conical space formed by the cone-shaped partial conical bodies. The annular combustion chamber walls are protected from excessive material temperatures by a combination of convection cooling and film cooling with the aid of a cooling mass flow.

A hood, via which the main mass flow flows directly to the burners and which generates the pressure drop necessary for maintaining the required cooling mass flow, is structurally arranged before the burners. This throttling action, however, impairs the efficiency while, at the same time, the mass flow supplied to the combustion chamber via the film cooling indirectly contributes to a deterioration in the $NO_x$ figures.

SUMMARY OF THE INVENTION

Accordingly, one object of the invention is to avoid all these disadvantages and, in a gas turbine combustion chamber, to shape the cooling duct in such a way that pure convective cooling of the combustion chamber walls becomes possible and in such a way that, by means of a method of operating the combustion chamber, the efficiency of the gas turbine combustion chamber is increased.

This is achieved in the invention by the gas turbine combustion chamber having a cooling duct which has a continuously decreasing height and/or increasing surface roughness in the flow direction of the cooling air and by the gas turbine combustion chamber being operated in such a way that the total mass flow coming from the compressor flows through the cooling duct, is used for pure convective cooling of the combustion chamber walls and the total mass flow subsequently takes part in the combustion.

The advantages of the invention may be seen, inter alia, in the fact that the efficiency of the gas turbine combustion chamber is increased by a reduction in the throttling losses and that the $NO_x$ emissions are minimized at the same time.

It is particularly expedient for the height of the cooling duct to decrease linearly in the flow direction in order to achieve matching of the cooling effect to a locally different thermal load. The height of the cooling duct in the flow direction can, however, also decrease exponentially, for example.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
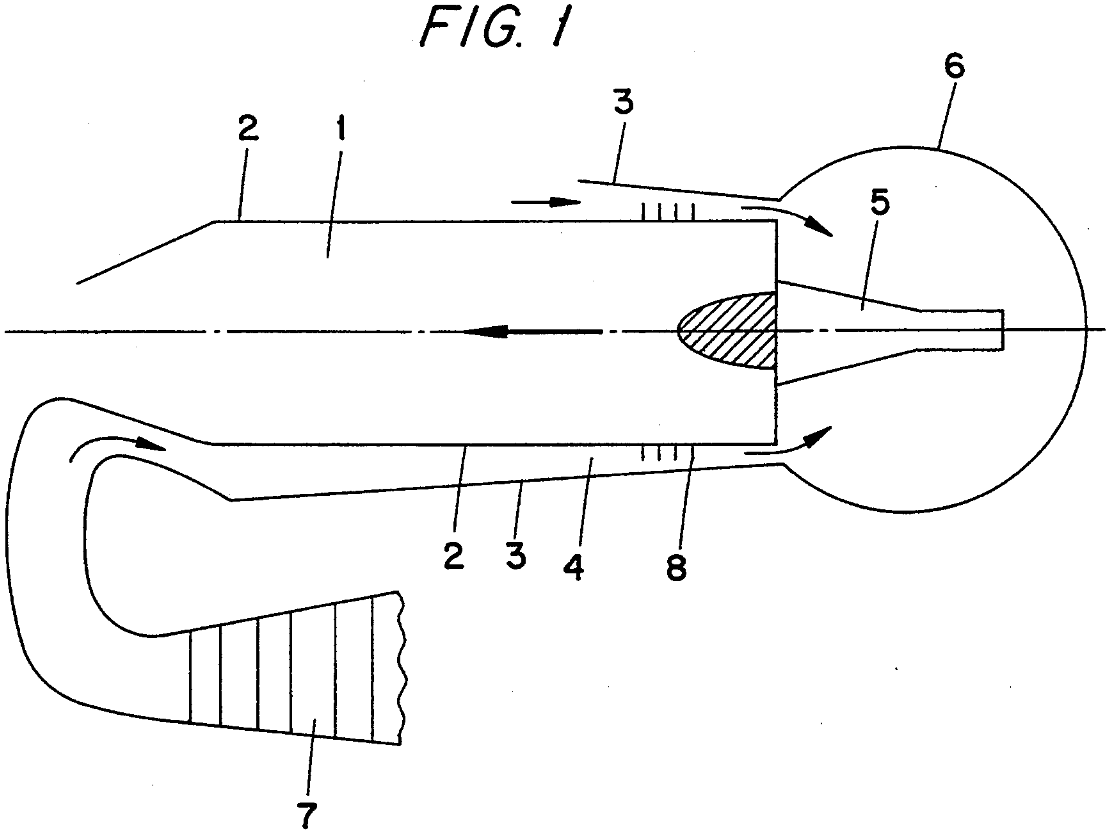
FIG. 1 shows a partial longitudinal section of the gas turbine combustion chamber.

Referring now to the drawings, wherein like reference numerals designate identical or corresponding parts throughout the several views, wherein the flow direction of the working medium is indicated by arrows and wherein only the elements essential for understanding the invention are shown, a first embodiment example of the gas turbine combustion chamber 1 according to the invention is shown in FIG. 1. It is an annular combustion chamber 1 with a combustion chamber inner wall 2 and a combustion chamber outer wall 3. The two walls 2, 3 bound the cooling duct 4 of the combustion chamber 1. The combustion chamber 1 is equipped with environment-friendly burners 5 of which, for the purpose of simplification, only one burner 5 is represented in FIG. 1. As is known from U.S. Pat. No. 4,932,861 to Keller, these burners 5 consist of at least two hollow partial conical bodies 20, 22, which are positioned one upon the other in a flow direction from an inlet 24 to an outlet 26 of the burner and whose longitudinal axes of symmetry extend radially offset relative to one another, by which means tangential opposed-flow air inlet slots 28, 30 are produced for a combustion airflow indicated by the arrows, at least one nozzle 32 for spraying in the fuel being placed in the hollow conical space formed by the cone-shaped partial conical bodies. A hood 6 is arranged before the environment-friendly burners 5.

Figure 2:
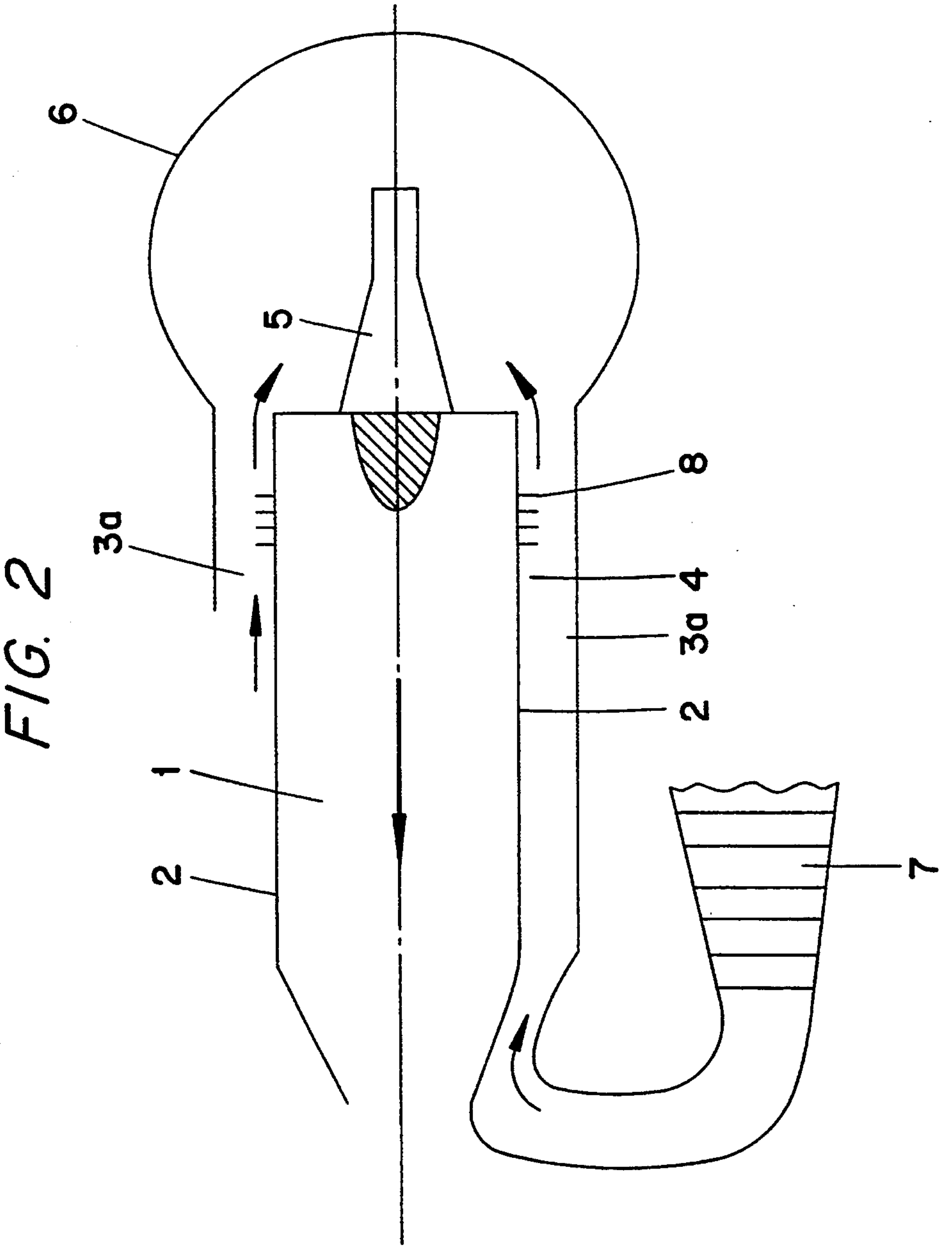
FIG. 2 is an alternative embodiment of the combustion chamber of FIG. 1.
Figure 3:
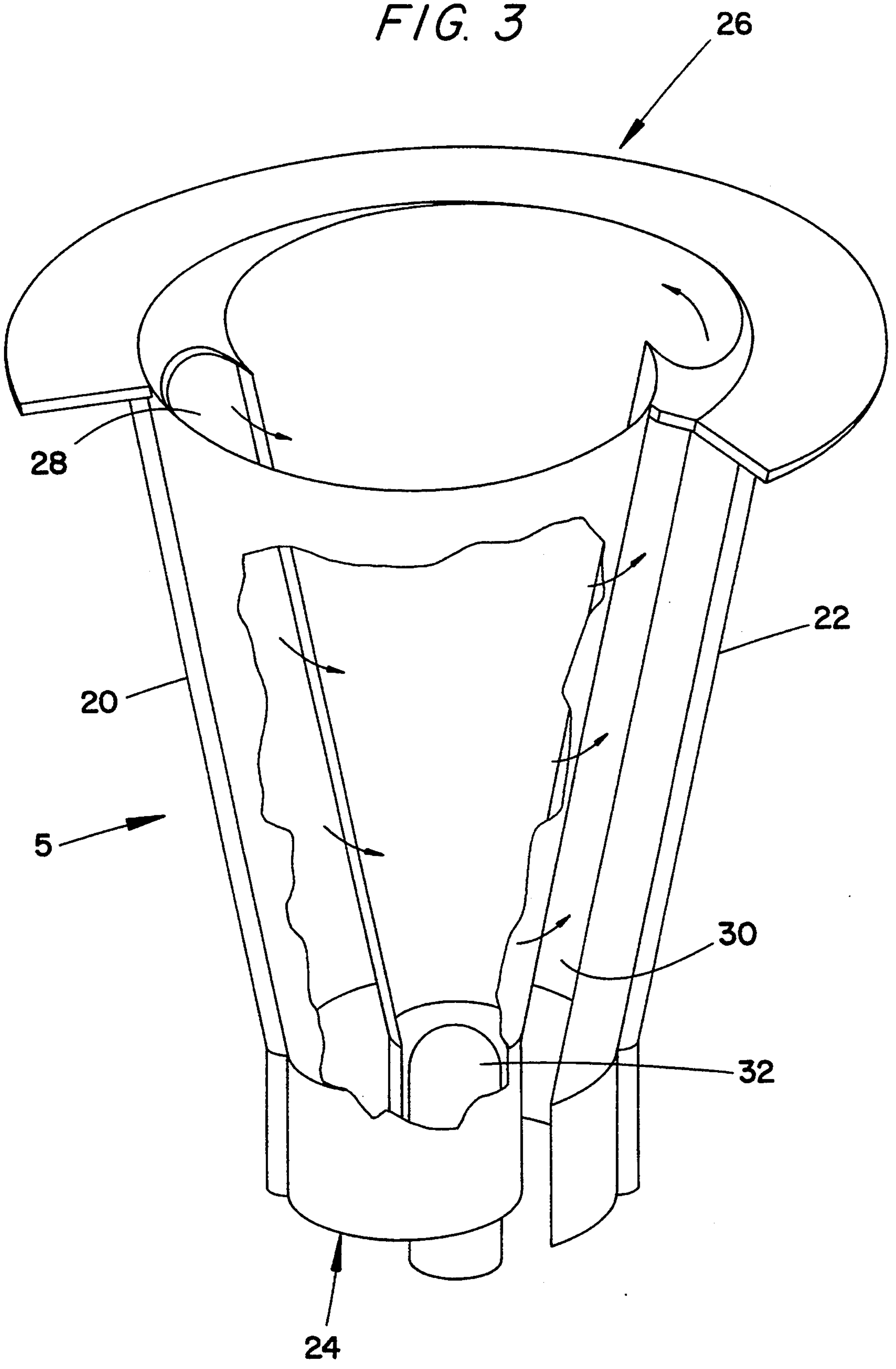
FIG. 3 is a perspective view of a burner in the combustion chamber of FIG. 1 and FIG. 2; and, FIG. 4 shows how the cooling air velocity and the heat transfer coefficient depend on the height of the cooling air duct over the length of the combustion chamber.

The essential feature of the invention now consists in the fact that the total mass flow coming from the compressor 7 is used for pure convective cooling of the combustion chamber 1. This is done by matching the cooling effect to the locally varying thermal load by providing the cooling duct 4 with a height which decreases continuously in the flow direction of the cooling air. In the embodiment of FIG. 1, the height of the cooling duct 4 decreases linearly. FIG. 2 illustrates an alternative embodiment of the combustion chamber 1 in which the cooling duct **4*a* remains a constant height. It can also, however, decrease exponentially, for example. It is a known fact that the convective cooling effect can be improved by the use of longitudinal ribs and transverse ribs 8 and for this reason, longitudinal ribs and transverse ribs 8 can be additionally arranged in the cooling duct 4**. As an additional option, the local surface roughness can also be varied.

Figure 4:
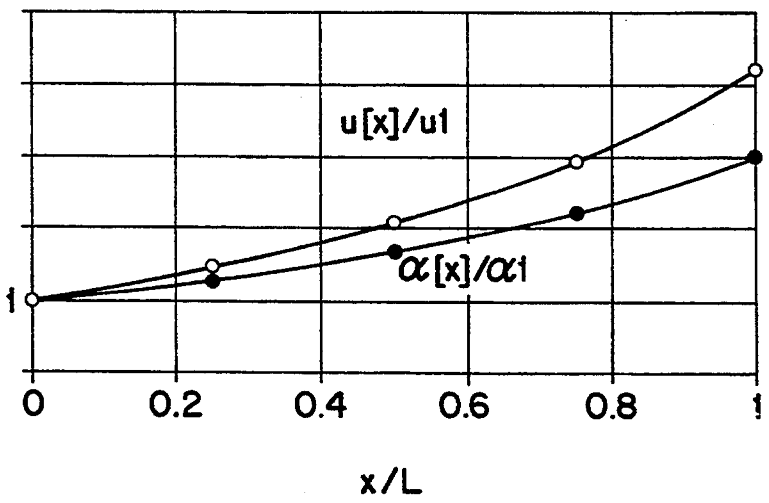

As may be seen from FIG. 4, the cooling air velocity u and the heat transfer coefficient $\alpha$ increase with decreasing height of the cooling duct 4 in the flow direction of the cooling air. This means that the maximum cooling effect is achieved where the maximum temperatures occur in the combustion chamber 1, i.e. cooling takes place to the greatest extent precisely where the greatest cooling effect is necessary.

The total mass flow coming from the compressor 7 is passed through the cooling duct 4 and cools the combustion chamber inner wall 2 as a consequence of pure convective cooling. The mass flow is therefore preheated by the cooling and subsequently flows within the hood 6 directly to the burners 5. In consequence, the total mass flow takes part in the combustion within the combustion chamber 1 and has a positive influence on the formation of $NO_x$.

The throttling losses are reduced as a function of the combustion chamber layout and there is an improvement in the efficiency relative to the prior art.

Obviously, numerous modifications and variations of the present invention are possible in light of the above teachings. It is therefore to be understood that within the scope of the appended claims, the invention may be practised otherwise than as specifically described herein.

What is claimed as new and desired to be secured by Letters Patent of the United States is:

1. A gas turbine combustion chamber, comprising:

at least one environment-friendly burner positioned at an inlet end of the combustion chamber, the burner comprising at least two hollow partial conical bodies positioned one upon the other in a burner flow direction, longitudinal axes of symmetry of the partial conical bodies being radially offset relative to one another so that tangential opposed-flow air inlet slots are produced for a combustion air flow, the burner having at least one nozzle for spraying in a fuel disposed in a hollow conical space formed by the cone-shaped partial conical bodies;

a cooling duct, bounded by a combustion chamber inner wall and a combustion chamber outer wall, the cooling duct connected to receive a total mass flow of compressed air from a compressor and lead the flow along the inner wall to the burner, wherein a surface roughness of the cooling duct increases in the flow direction of the cooling air, and a hood positioned at the inlet end of the combustion chamber to receive the total mass flow of compressed air from the cooling duct and direct the flow through the burner.

2. The gas turbine combustion chamber as claimed in claim 1, wherein the height of the cooling duct decreases linearly in the flow direction of the cooling air.

3. The gas turbine combustion chamber as claimed in claim 1, wherein the height of the cooling duct decreases exponentially in the flow direction of the cooling air.

4. The gas turbine combustion chamber as claimed in claim 1, wherein the cooling air duct has a constant height.

5. The gas turbine combustion chamber as claimed in claim 1, further comprising cooling fins disposed on the inner wall and projecting into the cooling duct.

* * * * *